(12) United States Patent
Honda

(10) Patent No.: US 7,016,086 B2
(45) Date of Patent: Mar. 21, 2006

(54) IMAGE FORMING APPARATUS

(75) Inventor: Masashi Honda, Yokohama (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 813 days.

(21) Appl. No.: 09/922,703

(22) Filed: Aug. 7, 2001

(65) Prior Publication Data

US 2003/0030855 A1 Feb. 13, 2003

(51) Int. Cl.
H04N 1/04 (2006.01)

(52) U.S. Cl. ............. 358/474; 358/1.2; 358/1.9; 358/501; 382/168; 382/271; 382/169

(58) Field of Classification Search ............. 358/474, 358/1.2, 1.9, 501, 505, 516, 538, 448, 461; 382/168, 271, 169
See application file for complete search history.

(56) References Cited

U.S. PATENT DOCUMENTS 5,724,444 A * 3/1998 Yamanishi ............. 382/168
6,047,092 A * 4/2000 Moro ..................... 382/261
6,249,298 B1 * 6/2001 Castegnier et al. ......... 347/188

FOREIGN PATENT DOCUMENTS

JP 8-317149 11/1996

* cited by examiner

Primary Examiner—Kimberly Williams
Assistant Examiner—Negussie Worku
(74) Attorney, Agent, or Firm—Foley & Lardner LLP (57) ABSTRACT

Image data provided from a scanner is simultaneously supplied to page memory and a reference value calculating section. The reference value calculating section creates a density histogram of the document image on the basis of image data corresponding to a predetermined number of image lines and calculates a set of correction reference values for pixel density correction using the density histogram. A range correcting section corrects pixel density indicated by the image data on all the image data read out from the page memory by using the set of correction reference values. The predetermined number of image lines is a fraction of all the image lines of the document image read by the scanner.

4 Claims, 6 Drawing Sheets

IMAGE FORMING APPARATUS

BACKGROUND OF THE INVENTION

The present invention relates to an image forming apparatus such as a copying machine, and in particular to a digital copying machine which forms an optimal image using a density histogram of a document or original image.

A so-called automatic exposure adjusting function where an optimal image is obtained by changing brightness of a document-illuminating lamp while detecting a density of a document or original image is a general function in an analog copying machine. In order to realize a function similar to the automatic exposure adjusting function in such an analog copying machine, such a measure is employed in a conventional digital copying machine that an optimal density is reproduced for each of documents of various kinds.

A method where an optimal image is obtained using a pixel density histogram indicating the number of existing pixels on a document image corresponding to each density is commonly employed in conventional machines. However, in order to perform image processing for improving image quality by pre-scanning a document and preparing a density histogram using all sampled pixels, not only a large amount of memory but also a large-scale of hardware and a considerably long processing time are required. Also, in a case that the pre-scanning processing is performed, scan must be performed twice, which results in reduction in productivity.

In order to solve this problem, in Jpn. Pat. Appln. KOKAI Publication No. 8-88772, such a technique has been disclosed that, in a real time automatic density adjusting system, histograms for respective image lines read by a scanner are accumulated and a reference value for range correction is sequentially changed on the basis of the result of the accumulation to perform an automatic density adjusting processing for each document. The reference value for range correction is a reference value applied when the density of image to be printed is corrected on the basis of a background density and a character or letter density of a document.

In the system disclosed in the above publication, the reference value for range correction is sequentially changed for each image line on the basis of the histograms accumulated. Therefore, even in a case of characters or photographs with the same density in one document, information about the accumulated histograms thereof varies according to the status of a document image around the characters or photographs, which results in difference in reference value for range correction. Accordingly, it has been difficult to achieve even density reproduction in a document image. When the reference value for range correction is fixed in order to achieve even density reproduction in a document image, of course, it becomes impossible to achieve an optimal density adjustment to another document with a different background density.

Also, in Jpn. Pat. Appln. KOKAI Publication No. 8-317149, a method or process where any pre-scanning is not performed as image data is stored in RAM has been disclosed. In this method, however, a background processing is not performed as image processing but it is performed as circuit control using a data comparator. In this publication, therefore, it has been impossible to remove a background and reproduce a character(s) densely, which can be achieved in a range correction processing performed as the image processing.

BRIEF SUMMARY OF THE INVENTION

An object of the present invention is to provide, in a digital copying machine, an automatic density adjustment processing system where even density reproduction suitable for a kind of a document to be processed can be realized without processing any pre-scanning.

In order to achieve the above object, according to one aspect of the present invention, there is provided an image processing apparatus comprising: a scanner section which reads a document in a main scanning direction and in a sub-scanning direction to provide image data indicating a density of each pixel within a document image for each image line in the main scanning direction; a storing section which stores the image data provided from the scanner in a memory; a histogram creating section which takes in the image data provided from the scanner for each image line and creates a density histogram of the document image on the basis of image data corresponding to a predetermined number of image lines; a correction reference value calculating section which calculates a set of correction reference values for pixel density correction using the density histogram created in the histogram creating section; a pixel density correcting section which reads out the image data stored in the memory and performs correction of a pixel density indicated by the image data on all the read image data using the set of correction reference values calculated in the correction reference value calculating section; and image forming means which forms an image from the pixel density corrected in the pixel density correcting section. The predetermined number of image lines is equal to or less than the number of all the image lines on the document image read by the scanner section.

In the above aspect, image data is accumulated in a delay memory during real time processing of one scan of a document at the scanner section and simultaneously a density histogram of a document image is created using partial image data of the document image, and a set of reference values for range correction are determined using the density histogram. An automatic density adjusting processing is performed on all the image data read out from the delay memory using a set of reference values for range correction. Therefore, according to the aspect, the automatic density adjustment processing corresponding to the kind of the document can be performed without deterioration of throughput in a copying machine and an even density reproduction can be realized within a document.

According to anther aspect of the present invention, there is provided an image processing system comprising: a storing section which stores image data indicating a density of each pixel within a document image into a memory; a histogram creating section which takes in the image data indicating the density of each pixel within the document image and creates a density histogram of the document image on the basis of a predetermined amount of image data; a correction reference value calculating section which calculates a set of correction reference values for pixel density correction using the density histogram created in the histogram creating section; and a pixel density correcting section which reads out image data stored in the memory and corrects pixel density indicated by the image data regarding all the image data read out using the set of correction reference values calculated in the correction reference value calculating section.

DETAILED DESCRIPTION OF THE PREFERRED EMBODIMENTS

One embodiment of the present invention will be explained below with reference to the drawings.

Figure 1:
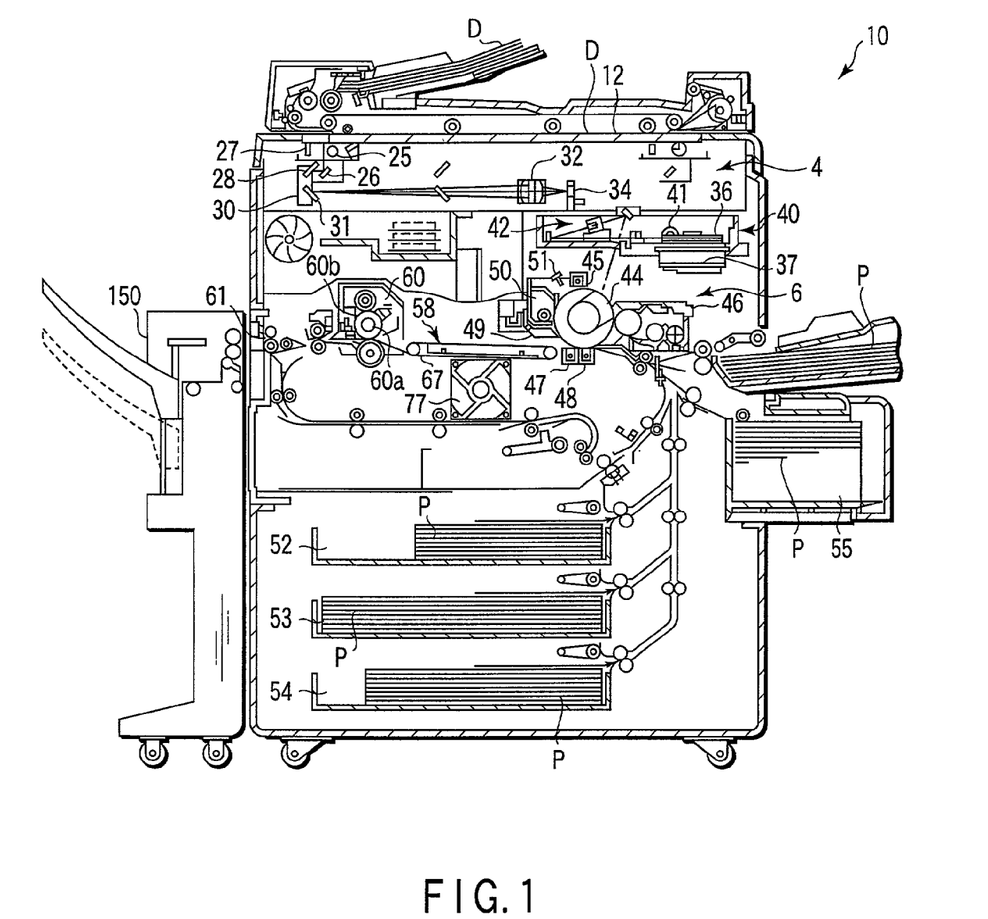
FIG. 1 is a sectional view showing an interior structure of a digital copying machine to which the present invention is applied.

FIG. 1 is a sectional view showing an interior structure of a digital copying machine 10 to which the present invention is applied. Provided in the digital copying machine 10 are a scanner section 4 which functions as reading means and a printer section 6 which functions as image forming section, which will be described later.

The scanner section 4 includes a document stand 12, first and second carriages 27, 28, a focusing or image forming lens 32 and a CCD sensor 34. Mounted on the first carriage 27 are an exposing lamp 25 and a first mirror 26. Mounted to the second carriage 28 are second and third mirrors 30, 31. The first and second carriages 27, 28 are moved in parallel to the document stand 12, and the second carriage 28 is moved at a speed of ½ of the first carriage 27.

In the scanner section 4, a document D put on the document stand 12 is illuminated by the exposing lamp 25 and reflected light from the document D is guided up to a light receiving face of the CCD sensor 34 via the first to third mirrors 26 to 31 and the focusing lens 32, so that a line-shaped reflected light (image line) focused on the light receiving face is subjected to photo-electric conversion.

On the other hand, the printer section 6 includes a laser exposing device 40, a photosensitive drum 44, paper cassettes 52 to 55, a fusing device 60 and a finisher 150.

In the laser exposing device 40, laser beam emitted from a semiconductor laser 41 which is ON/OFF-controlled according to image information or the like from the scanner section 4 is guided to the photosensitive drum 44 via a rotating polygon mirror 36 and a laser optical system 42 to form an electrostatic latent image on a surface of the photosensitive drum 44.

An electron charger 45, a developing device 46, a peeling-off charger 47, a transfer charger 48, a peeling-off claw 49, a cleaning device 50, a charge remover 51 are arranged around the photosensitive drum 44 in this order, and a toner image corresponding to the electrostatic latent image on the photosensitive drum 44 is transferred on a paper P fed from, for example, the paper cassette 55.

The paper on which the toner image has been transferred is conveyed to the fixing device 60 via a conveying path 58, and the toner image is fixed on the paper by a fixing lamp 60a and a heat roller 60b of the fixing device 60 to be ejected or discharged onto a single tray of the finisher 150 via an ejecting port 61.

Figure 2:
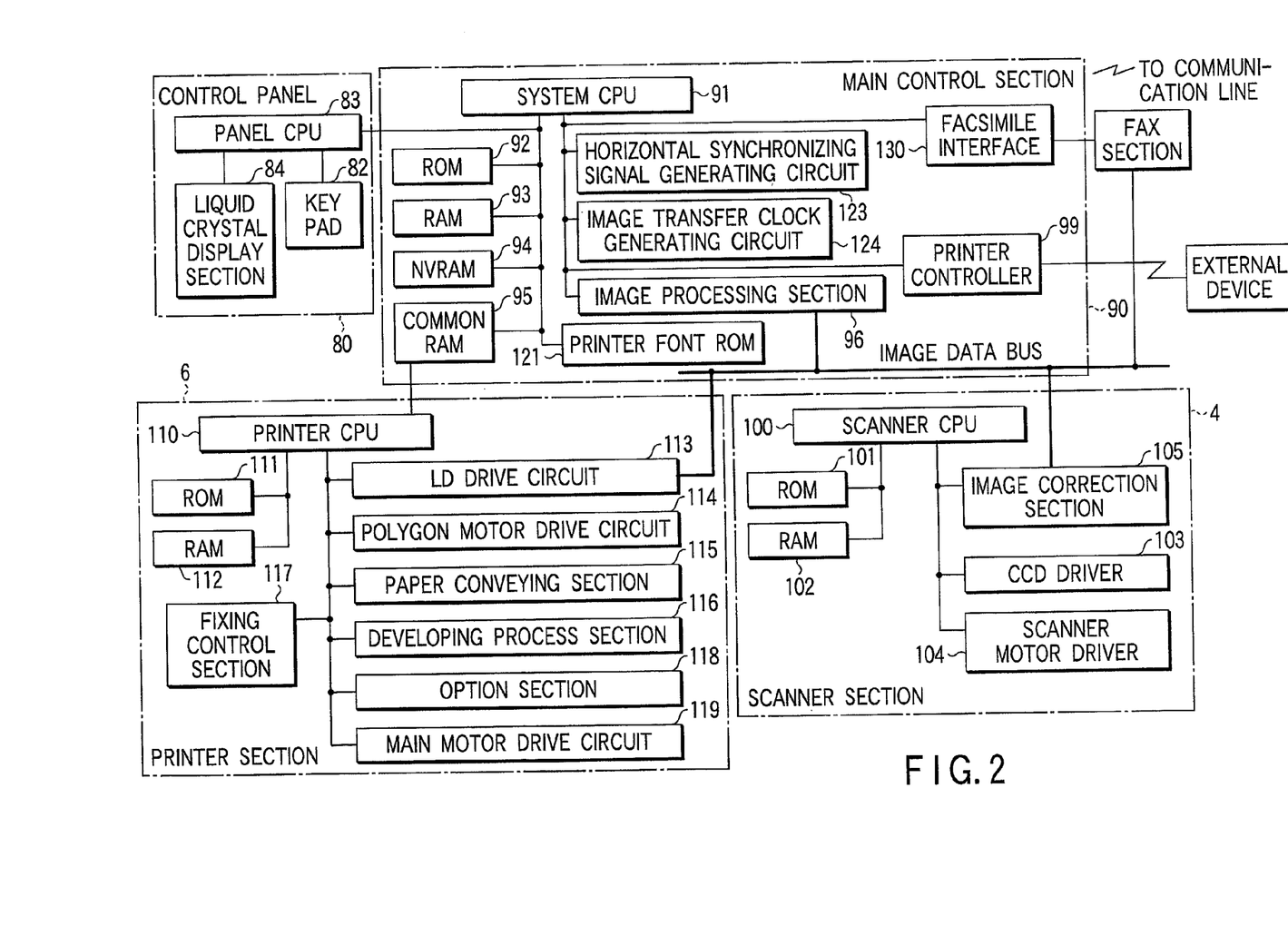
FIG. 2 is a block diagram showing a configuration of a control system for the digital copying machine to which the present invention is applied.

FIG. 2 is a block diagram schematically showing configuration of a control system of the digital copying machine to which the present invention is applied.

The digital copying machine comprises a main control section 90 controlled by a system CPU 91, the scanner section 4 controlled by a scanner CPU 100, the printer section 6 controlled by a printer CPU 110, and a control panel 80 controlled by a panel CPU 83.

The control panel 80 includes a key pad 82, the panel CPU 83, and a liquid crystal display section 84. A setting screen for printing conditions and the like are displayed on the liquid crystal display section 84, and the panel CPU 83 receives data about printing conditions key-input by a user via the key pad 82 to transfer the key-input data to the main control section 90 and perform displaying on the liquid crystal display section 84.

The main control section 90 includes the system CPU 91, a ROM 92, a RAM 93, a NVRAM (Nonvolatile RAM) 94, a common RAM 95, an image processing section 96, a printer font ROM 121, a horizontal synchronizing signal generating circuit 123, an image transferring clock generating circuit 124, and a facsimile interface 130.

The system CPU 91 uses the RAM 93 as a working area to control the entire of the main control section 90 according to a control program including the present invention stored in the ROM 92 and the key-input data received from the control panel 80. The system CPU 91 transmits operation instructions to the printer 6 (printer CPU 110) and the scanner 4 (scanner CPU 100), and the printer 2 and the scanner 4 return back their statuses to the system CPU 91.

The NVRAM 94 is a non-volatile memory backed up by a battery (not shown), so that the data in the NVRAM 94 can be reserved even when power is turned off. Also, the NVRAM 94 stores default values (initial set values) for hardware elements constituting a reproducing or copying (PPC) function, a FAX function and the like therein. The common RAM 95 is used so as to perform bi-directional communication between the system CPU 91 and the printer CPU 110.

The image processing section 96 performs such image processings by the present invention as range correction, trimming, masking and the like on image data input from the scanner section 4 and the like. The printer font ROM 121 stores font data corresponding to code data such as character code or the like therein.

A printer controller 99 receives code data such as character code or the like from an external device such as a personal computer or the like via a LAN. The printer controller 99 develops the code data with a character size and at a resolution according to data indicating the character size and the resolution attached to the code data using font data stored in the printer font ROM 121 to store the developed code data in a page memory 98.

The horizontal synchronizing signal generating circuit 123 generates horizontal synchronizing signal synchronized with rotation of the polygon mirror 36. The image transferring clock generating circuit 124 generates a image transferring clock which controls a timing for transferring image data.

The printer section 6 includes the printer CPU 110 which controls the entire of the printer section 6, a ROM 111 in which a control program and the like have been stored, a RAM 112 for data storage, a LD drive circuit 113 which performs on/off-control of emission from the semiconductor laser 41, a polygon motor drive circuit 114 which controls rotation of a polygon motor 37 in the laser exposing device or laser unit 40, a paper conveying section 115, a developing process section 116, a fixation control section 117, an option section 118, and a main motor drive circuit 119.

The scanner section 4 includes the scanner CPU 100, a ROM 101, a RAM 102, a CCD driver 103, a scanner motor driver 104, and an image correction section 105. The scanner CPU 100 controls the scanner section 4 wholly, the ROM 101 stores a control program and the like therein, and the RAM 102 is used to temporarily store data therein. The CCD driver 103 drives the CCD sensor 34, and the scanner motor driver 104 controls rotation of a drive motor 38 which moves the first and second carriages 27 and 28 for the exposing lamp 25 and the mirrors 26, 30, 31 and the like. The image correction section 105 includes an A/D converting circuit which converts an analog signal from the CCD sensor 34 to a digital signal and a shading correction circuit for correcting a variation of a threshold level to an output signal from the CCD sensor 34 due to a variation of the CCD sensor 34 itself or a temperature change of an ambient atmosphere.

Figure 3:
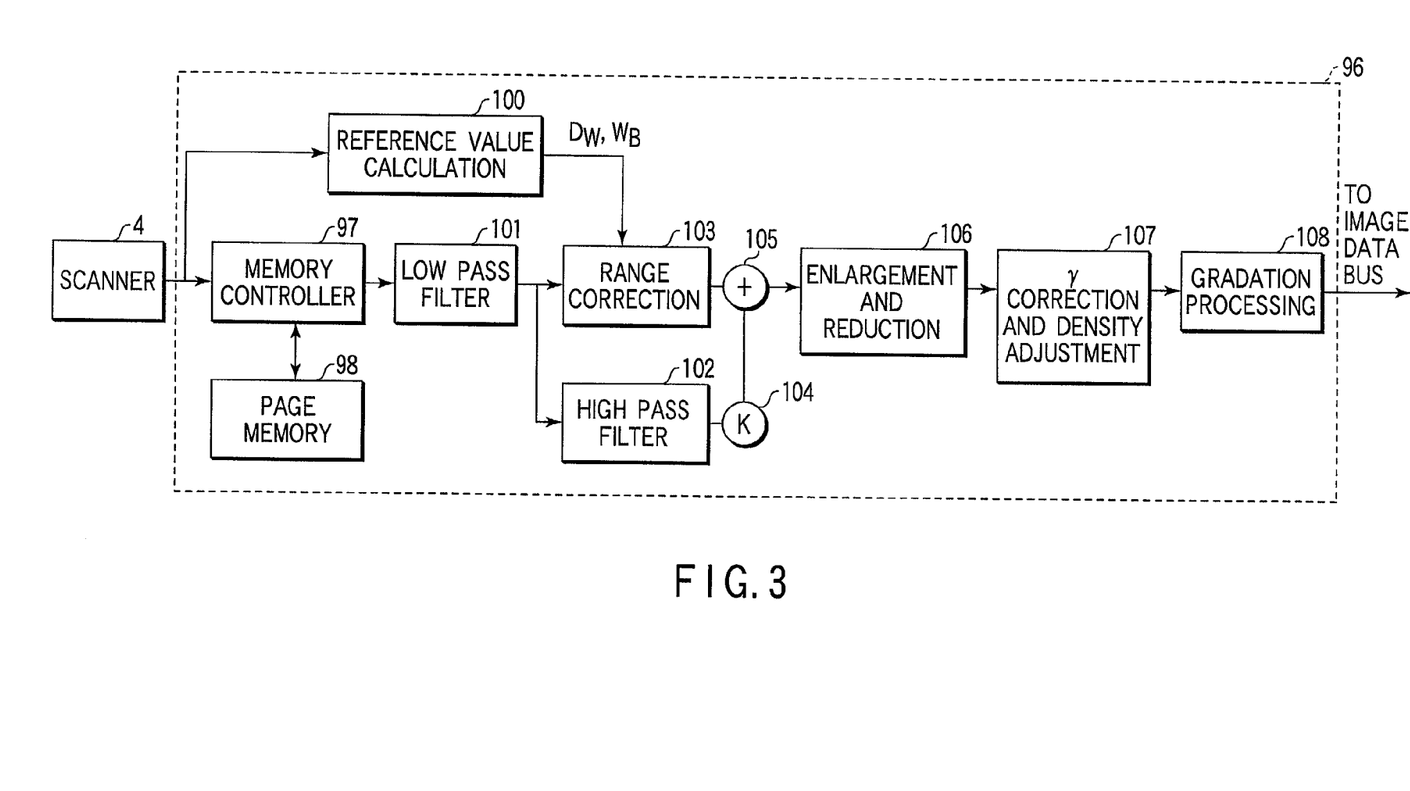
FIG. 3 is a block diagram showing a configuration of an image processing section according to the present invention.

FIG. 3 is a block diagram showing a configuration of the image processing section 96 according to the present invention. The image processing section 96 includes a memory controller 97, the page memory 98, the reference value calculating section 100, a low pass filter 101, a high pass filter 102, a range correction section 103, an amplifier 104, an adder 105, a scaling section 106, a correction section 107, and a gradation processing section 108.

Document image data read by the scanner section 4 is supplied to the memory controller 97 and the reference value calculating section 100. The reference value calculating section 100 creates a density histogram on the basis of image data form the scanner section 4 to calculate a reference value for range correction (describe later) from the density histogram.

The memory controller 97 stores image data from the scanner section 4 into the page memory 98. The memory controller 97 starts reading-out of the image data stored in the page memory 98 after the reference value has been determined in the reference value calculating section 100. The image data read out from the page memory 98 is filtrated by the low pass filter 101 to be supplied to the range correction section 103 and the high pass filter 102.

The data filtrated by the high pass filter 102 is multiplied k-fold by the amplifier 106 to be supplied to the adder 105. The adder 105 adds the image data subjected to range correction in the range correction section 103 and the image data amplified by the amplifier 106 to each other. The image data supplied from the adder 105 is subjected to an enlarging processing or a reducing processing in the scaling section 106 to be supplied to the correction section 107. The correction section 107 performs γ correction of the scanner section 4 or the printer section 6 and the entire density adjustment. The graduation processing section 108 performs gradation processing such as a screening processing or the like on the image data corrected in the correction section 107. The image data processed in the gradation processing section 108 is supplied to the LD drive circuit 113 (refer to FIG. 2) via an image data bus.

The density histogram created in the reference value calculating section 100 will be explained now.

Figure 4A:
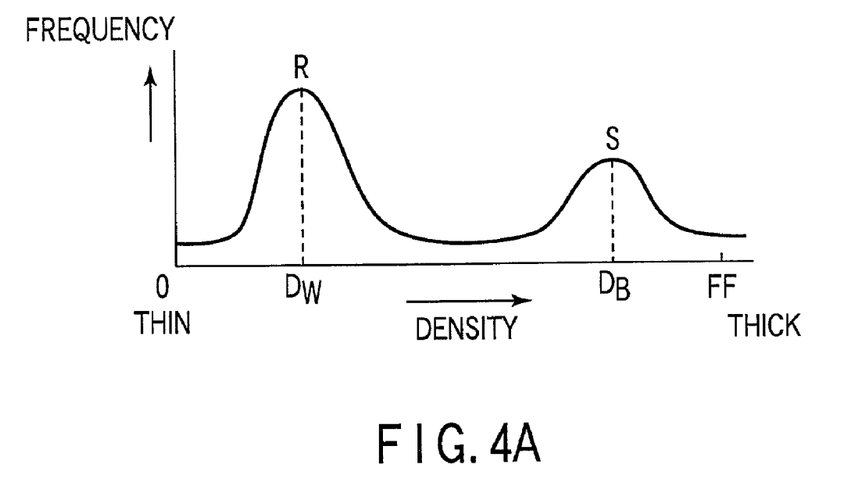
FIG. 4A is a graph showing one example of a density histogram.

FIG. 4A is a graph showing one example of a density histogram. For example, assuming that an image of A4 size is read in at a resolution of 400 dpi, the total pixel number G is expressed by the following equation.

$$G=210*297*(400/25.4)^2$$

Each pixel of the total pixel number G has a density, where the density is expressed by 8 bits (256 steps). The horizontal axis in FIG. 4A indicates the density, or pixel value, and the vertical axis therein indicates the frequency (the number of pixels) indicating the numbers of pixels with respective densities. Incidentally, in order to reduce hardware scale and processing time, the reference value calculating section 100 creates a density histogram by dividing the density into 16 stages to simplify the density of 256 stages into 16 stages. That is, the lower 4 bits in the pixel values of 8 bits are ignored.

In general, in a case of a document such as a newspaper, since there is a considerable amount of background density, one mountain is formed in a background density portion as shown with "R" in FIG. 4A, and one mountain is also formed in a character density portion as shown with "S". Here, in the analog copying machine, the background density portion can be eliminated by controlling an exposure lamp, but in the digital copying machine, a similar effect can be achieved by a method such as described below.

Figure 4B:
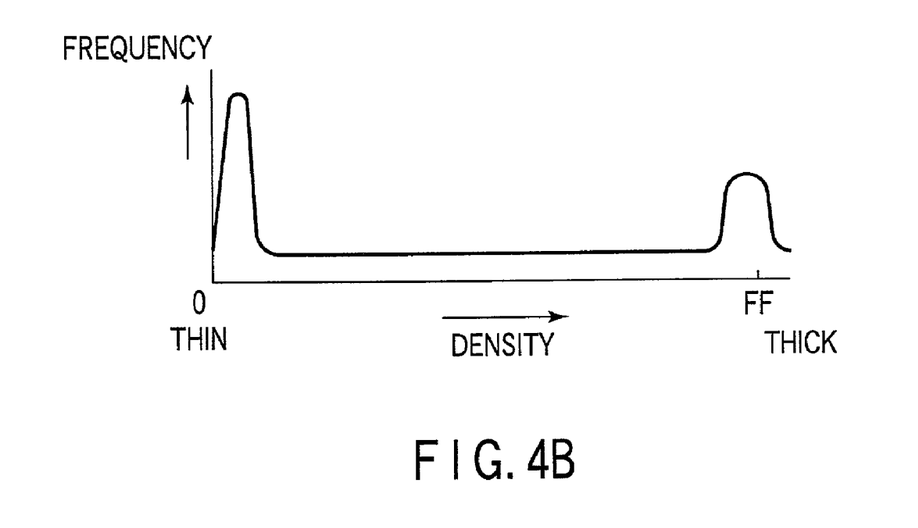
FIG. 4B is a graph showing one example of a density histogram after range correction.

According to explanation through a simple example, the densities $D_W$ and $D_B$ which correspond to the peak points of the mountain "R" and the mountain "S" shown in FIG. 4A, respectively are obtained and the following calculation is made so that the density histogram is converted to a distribution as shown in FIG. 4B. Here, the densities $D_W$ and $D_B$ are reference values applied in a case of performing the range correction, and they are called white side reference value and black side reference value, which are calculated in the reference value calculating section 100.

$$D_N=(D_I-D_W)*FF[H]/(D_B-D_W)$$

Where $D_N$ is a corrected pixel density, $D_I$ is an input pixel density, an FF[H] is the maximum pixel density indicated by hexadecimal number. That is, the range (density width) between R and N in FIG. 4A is spread to a range of 0 to FF[H]. The range correction section 103 performs such correction on input image data.

Figure 5:
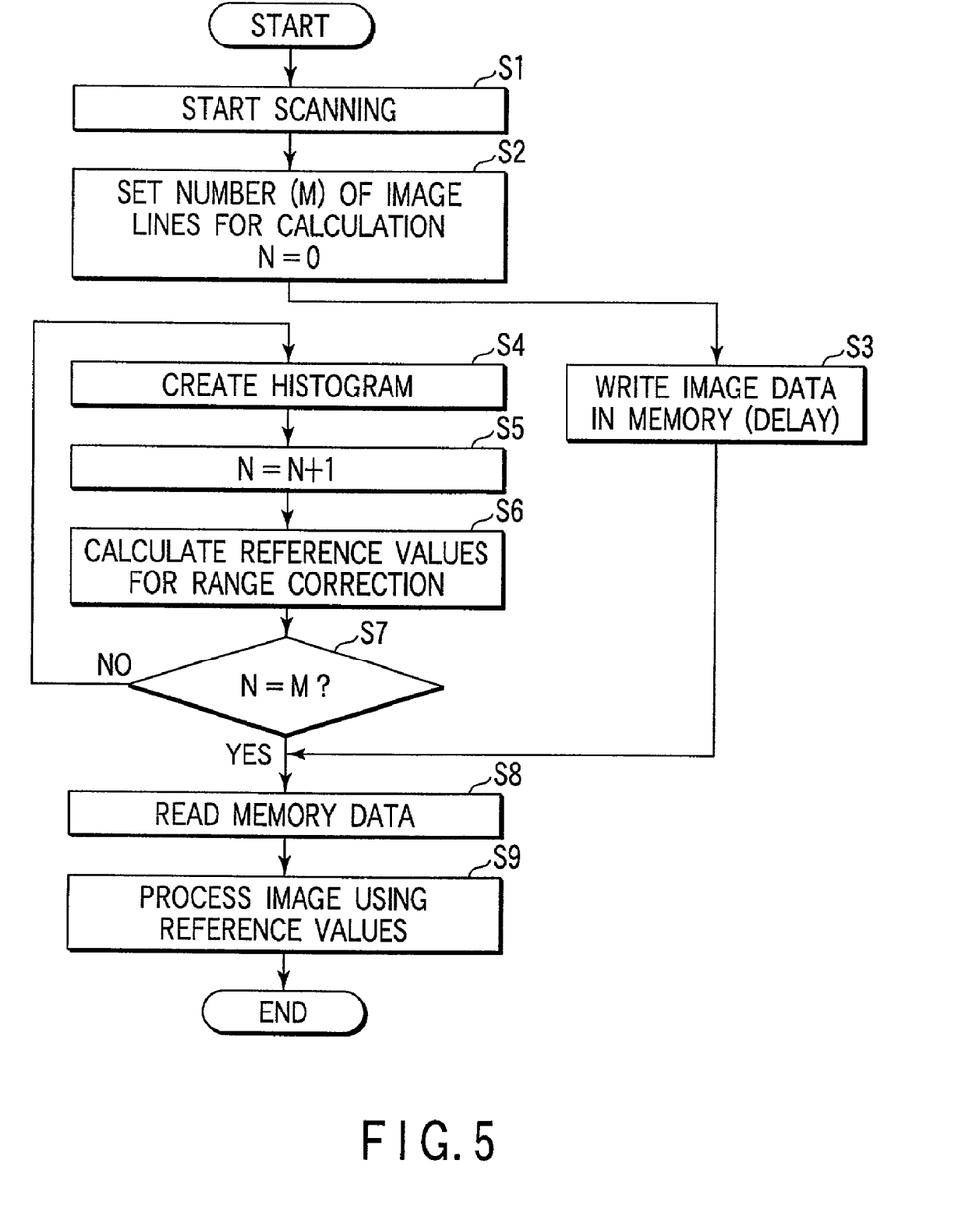
FIG. 5 is a flowchart showing an image processing operation according to one embodiment of the present invention.

An operation of image processing according to the present invention will be explained now. FIG. 5 is a flowchart showing an image processing operation according to one embodiment of the present invention.

After the system CPU 91 sends a scan start command to the scanner CPU 100, it sets the number M of image lines for calculation used for calculating the reference value for range correction (Steps S1 and S2). The number M of image lines is the number of scanning lines equal to or less than that of one page of a document, for example, it is 3,000. This number of 3,000 corresponds to the number of image lines read in by the CCD line sensor 34 in a case that a document is read by a size of about 12 cm along the sub-scanning direction at a resolution of 600 dpi. That is, the data corresponding to the number M of image lines is data including a partial area of a document image. According to increase in the number of image lines for calculation, a histogram reflecting the density of a document more accurately can be created, but a processing time is increased. Accordingly, the number M of image lines must be set to an appropriate value according to the size of a document to be scanned.

The image data of the document read by the scanner section 4 is output to the memory controller 97 and the reference value calculating section 100. The memory controller 97 starts writing operation of the image data into the page memory 98 (Step S3).

The reference value calculating section 100 takes in the image data from the scanner section 4, creation of such a density histogram as shown in FIG. 4A is started (Step S4). At this time, in the reference value calculating section 100 and the memory controller 97, 1 is added to the number N of taken-in lines each time when a histogram is created by taking in image data corresponding to one image line, as shown in Step S5.

In this embodiment, the reference value calculating section 100 multiplies the frequency of the histogram created up to the preceding image line (the number of pixels corresponding to each image density) by a weighting coefficient corresponding to the number N of taken-in line, it multiplies the frequency of the histogram about the current image line by another weighting coefficient corresponding to the number N of line, and it creates a density histogram by adding these multiplied results to each other. Therefore, the total amount of frequency data constituting the density histogram created by taking in each image line is kept constant. Incidentally, a hardware configuration for creating this histogram has been explained in U.S. Pat. No. 5,724,444.

Furthermore, the reference value calculating section 100 calculates a white side reference value $D_W$ indicating a background density and a black side reference value $D_B$ indicating a character density which are reference values for range correction such as shown in FIG. 4A (Step S6). Each time when such reference values are calculated, the reference value calculating section 100 makes a determination about whether the number N of taken-in lines coincides with the number M of lines for calculation (Step S7). When the number N of taken-in lines does not coincide with the number N, a flow returns back to Step S4, and image data corresponding to the next one image line is taken in the reference value calculating section 100, so that creation (updating) of the histograms and calculation (updating) of the reference values are repeated.

In the memory controller 97, when the number N of taken-in lines coincides with the number N (Yes in Step S7), reading-out of the document image data stored in the page memory 98 is started (Step S8). That is, the image data is stored in page memory and the timing for reading-out thereof is delayed by a time corresponding to the M lines so that the memory controller 97 delays the image data in the page memory 98. At this time, reading of the document image at the scanner section 4 is performed subsequently so that the page memory 98 conducts both writing-in and reading-out of the image data.

Incidentally, in Step S3, when the image data is written in the page memory 98, the system CPU 91 may control the reference value calculating section 100 and the memory controller 97 such that, when the data corresponding to the number M (a predetermined number) of image lines for calculation has been stored in the page memory 98, reading-out of data starts from the image data which has been first written in. Alternatively, as means for delaying the image data, a FIFO (first-in first-out) memory which can store data corresponding to the number M of image lines may be used.

The range correction section 103 performs range correction processing on the image data provided from the memory controller 97 via the low path filter 101 using the white and black side reference values $D_W$ and $D_B$ calculated from the data corresponding to the number M of image lines in the reference value calculating section 100. As a result, the entire one page of the document image is processed using a pair of the reference values ($D_W$ and $D_B$).

Thus, in the present invention, the image data captured by the scanner section 4 is taken in the reference value calculating section 100 where the histogram creation is conducted. In parallel to such a processing, the image data is taken in the memory, and reading-out of the image data is delayed by a time period required for the histogram creation (equal to or less one page of a document). The reference value (white side reference value) of a background reproduction and the reference value (black side reference value) of a character reproduction which are the reference values for range correction are determined from the histogram created. Accordingly, it becomes possible to perform an optimal range correction for each document using image data corresponding to one page of the document or less. Also, it becomes possible to perform an appropriate range correction and an appropriate image formation with one time scanning.

Figure 6:
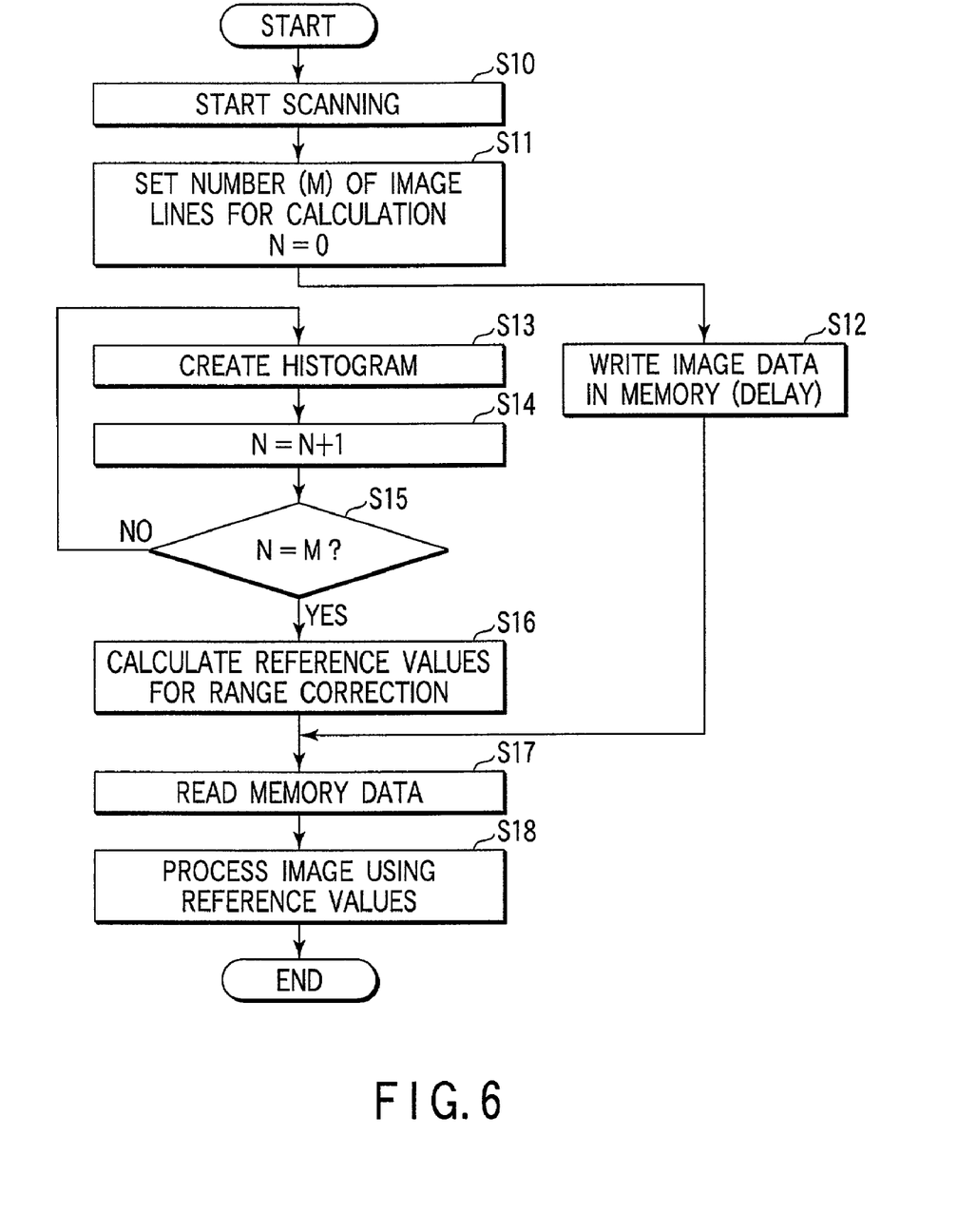
FIG. 6 is a flowchart showing an image processing operation according to anther embodiment of the present invention.

FIG. 6 is a flowchart showing an image processing operation according to a second embodiment of the present invention.

In the second embodiment, a calculation of a set of reference value for range correction is performed only one time, as shown in Step S16, after image data corresponding to the number M of image lines for calculating the reference values is taken in the reference value calculating section 100 and the density histogram corresponding to the number M of image lines is created. Also, the creation of the density histogram shown in Step S13 may be created using high-order several bits of the image data without use of the weighting coefficient shown in the first embodiment. The other steps are the same as those in the first embodiment.

As mentioned above, according to the present invention, appropriate range correction reference values are determined by document scanning of one time, and an automatic density adjustment and image formation are performed. Accordingly, an automatic density adjustment which allows a dark color reproduction of a light color character, removal of a background portion or the like can be performed and an even density reproduction about image data corresponding to one page can be realized.

What is claimed is:

1. An image forming apparatus comprising:
    a scanner section which reads a document in a main scanning direction and in a sub-scanning direction to provide image data indicating a density of each pixel within a document image for each image line in the main scanning direction;
    a storing section which stores the image data provided from the scanner section in a memory;
    a setting section which sets the number of image lines for calculation used for calculation of reference values for density correction;
    a density histogram creating section which takes in the image data provided from the scanner for each image line and creates a density histogram of the document image on the basis of image data corresponding to the number of image lines for calculation set by the setting section;
    a correction reference value calculating section which calculates a set of correction reference values for pixel density correction using the density histogram created in the density histogram creating section;
    a pixel density correcting section which reads out the image data stored in the memory and performs correction of a pixel density indicated by the image data on all the read image data using the set of correction reference values calculated in the correction reference value calculating section; and an image forming section which forms an image from the pixel density corrected in the pixel density correcting section, wherein the correction reference value calculating section comprises a detecting section which detects two representative densities ($D_B$, $D_W$) of a background and a character of the document from the density histogram created by the density histogram creating section; and the pixel density correcting section corrects the input pixel density according to the following equation:

$$D_N = (D_1 - D_W) * FF[H] / (D_B - D_W)$$

where $D_1$ is an input pixel density, $D_W$ is a representative background density, $D_B$ is a representative character density, FFh is the maximum density indicated by hexadecimal number, and $D_N$ is a corrected pixel density.

2. The apparatus according to claim 1, wherein the number of image lines for calculation set by the setting section is equal to or less than that of all image lines of the document image read out from the scanner section.

3. The apparatus according to claim 1, wherein the storing section starts reading-out of data when data corresponding to the number of image lines for calculation set by the setting section has been stored in the memory.

4. The apparatus according to claim 1, wherein the density histogram creating section keeps a total data amount of the density histogram constant irrespective of the number of image lines taken in.

* * * * *